US008498001B2

(12) United States Patent
Zach

(10) Patent No.: US 8,498,001 B2
(45) Date of Patent: Jul. 30, 2013

(54) DIGITAL PRINTING STATION IN A MULTI-STATION DISCRETE MEDIA PRINTING SYSTEM

(76) Inventor: Moshe Zach, Tel Aviv (IL)

( * ) Notice: Subject to any disclaimer, the term of this patent is extended or adjusted under 35 U.S.C. 154(b) by 971 days.

(21) Appl. No.: 12/159,487

(22) PCT Filed: Jan. 2, 2007

(86) PCT No.: PCT/ZA2007/000001

§ 371 (c)(1), (2), (4) Date: Jun. 27, 2008

(87) PCT Pub. No.: WO2007/147175

PCT Pub. Date: Dec. 21, 2007

(65) Prior Publication Data

US 2009/0097044 A1 Apr. 16, 2009

(30) Foreign Application Priority Data

Dec. 28, 2005 (IL) .......................................... 172857

(51) Int. Cl.
*G06F 3/12* (2006.01)
*B41F 15/04* (2006.01)

(52) U.S. Cl.
USPC .......................................... 358/1.14; 101/115

(58) Field of Classification Search
USPC ................. 358/1.14; 101/115, 114, 425, 126, 101/38.1
See application file for complete search history.

(56) References Cited

U.S. PATENT DOCUMENTS

| | | | | |
|---|---|---|---|---|
| 5,600,362 | A * | 2/1997 | Morgavi et al. | 347/218 |
| 5,801,739 | A | 9/1998 | Silverbrook | |
| 5,887,519 | A * | 3/1999 | Zelko | 101/115 |
| 6,158,343 | A * | 12/2000 | Hoffman et al. | 101/425 |
| 6,257,137 | B1 * | 7/2001 | Witte | 101/129 |
| 6,425,331 | B1 * | 7/2002 | Xu et al. | 101/488 |
| 6,571,697 | B2 * | 6/2003 | Eppinger | 101/126 |
| 6,651,554 | B1 * | 11/2003 | Williams | 101/126 |
| 6,948,425 | B2 * | 9/2005 | Dumenil | 101/38.1 |
| 7,163,267 | B2 * | 1/2007 | Dumenil | 347/2 |
| 2004/0085425 | A1 | 5/2004 | Lewis | |
| 2005/0087083 | A1 * | 4/2005 | Dumenil | 101/115 |
| 2005/0247216 | A1 | 11/2005 | Reichwein et al. | |
| 2006/0162586 | A1 * | 7/2006 | Fresener et al. | 101/115 |
| 2006/0207448 | A1 * | 9/2006 | Fresener et al. | 101/115 |
| 2006/0249039 | A1 | 11/2006 | Feldman et al. | |
| 2007/0022883 | A1 * | 2/2007 | Dubuit et al. | 101/115 |
| 2009/0090257 | A1 * | 4/2009 | Feldman et al. | 101/114 |

FOREIGN PATENT DOCUMENTS

| | | | | |
|---|---|---|---|---|
| DE | 195 32 724 | A1 | | 3/1997 |
| DE | 101 27 659 | A1 | | 12/2002 |
| EP | 0 997 275 | | | 5/2000 |
| EP | 1 726 444 | A1 | | 11/2006 |
| FR | 2 827 807 | A1 | | 1/2003 |
| GB | 2 381 501 | A | | 5/2003 |
| JP | 2006-212978 | | * | 8/2006 |
| WO | WO 2005/025873 | A2 | | 3/2005 |
| WO | WO 2006/027212 | A1 | | 3/2006 |

* cited by examiner

*Primary Examiner* — Jerome Grant, II
(74) *Attorney, Agent, or Firm* — Oliff & Berridge, PLC

(57) ABSTRACT

A multi-station discrete media printing system, comprising at least one digital printing station for imprinting objects, while they rest thereat, according to digital data supplied thereto. The digital printing station includes a digital printing subsystem, which cooperates with the system and includes at least one printhead that is operative to print an image or a pattern on each of the objects according to the supplied digital data, The digital printing subsystem preferably includes one or more printhead assemblies that are movable along at least one axis.

21 Claims, 7 Drawing Sheets

Top view

DIGITAL PRINTING STATION IN A MULTI-STATION DISCRETE MEDIA PRINTING SYSTEM

FIELD OF THE INVENTION

The field of the invention is multi-station printing system for discrete media or objects, such as garments or product parts, including so-called carousel printers. The field of the invention is also digital printing on such media or objects.

BACKGROUND

Multi-station discrete media printing systems are known and widely used to imprint objects of various media, such as, but not limited to, garments (e.g. T-shirts), packaging material and various parts of industrial products; the latter include, but not limited to, casings, front panels, labels and nameplates. The terms "discrete medium" and "object" will be used in the sequel interchangeably. Most such systems are configured circularly, and thus are referred to as carousels, but other configurations, such as a linear configuration are possible. FIG. 1 shows, by way of example, a top-view sketch of a typical carousel system, this one—with eight stations (denoted by dashed rectangles). It includes a rotating member with eight tablets, equally spaced around a circle, and is designed to rotate in steps of 45 degrees and to rest between steps while each tablet is at a corresponding station; during a complete rotation, each tablet rests consecutively at each station. The tablets serve as carriers for objects to imprinted. Usually a first station is a loading station, in which an object to be imprinted is loaded onto the tablet then resting there, and the last station is an unloading station, in which an imprinted object is unloaded from the tablet then resting there. Some or all of the other stations are equipped to perform certain processing to the objects—each station applying a unique process to an object resting thereat. Such processes may include, for example, cleaning, painting (e.g. by an airbrush), drying, imprinting an image and applying a protective coat. Imprinting an image may be done in several ink colors, in which case each color is usually imprinted at a corresponding station. Image imprinting is most commonly done by a screen-printing (also known as silk-screen) process (using a flat- or rotary screen). An additional type of process, intermediate between painting and image imprinting, which may used at some station, applies an opaque paint to certain portions of the object's surface—usually to serve as background for a subsequently imprinted image. In the context of the present disclosure, the terms "printing" and "imprinting" are to be understood as including any process of selectively laying down a substance on a medium or an object, resulting in a specified image or a specified area pattern of the substance.

Image printing in present-day multi-station printing system, using conventional printing technologies (such as the aforementioned screen-printing process), typically involves a printing form (e.g. a screen, in the case of screen-printing), in which there is an image-wise distribution of inking- and non-inking areas. This distribution is fixed for any one print run and causes identical images to be printed on all objects passing the corresponding station. When a different image is to be imprinted, a new form must be prepared and installed. Such a change involves expenditure of time, effort and materials and thus is costly. For short print runs the costs of changing a printing form become relatively high and for very short runs may become prohibitive. For the extreme case that every object carry a different (or even partially different) image, the use of conventional printing, with changing printing forms, becomes totally impractical. Yet short runs and, moreover, single-print (i.e. custom image) runs are increasingly desired. It should be noted that often a different image also requires a differently shaped background paint.

Another shortcoming of screen-printing, used in current multi-station printing systems, is that it does not readily lend itself to printing images with process color (i.e. where a large number of color values is achievable by printing various proportions of three or four basic ink colors). This is due to the low resolution and inaccurate registration between impressions at successive stations that are inherent to this technology.

There is thus a need for, and it would be advantageous to have, a multi-station discrete-media printing system that includes at least one printing station capable of printing images that may be frequently changed—preferably even between successively positioned individual objects. There is a further need for, and it would be advantageous to have, such a system that permits printing with process colors.

SUMMARY OF THE INVENTION

In one aspect of the invention there is provided a digital printing subsystem, to be included—singly or within a plurality of stations—in a multi-station discrete-media printing system. The system may have a rotary configuration (i.e. a so-called carousel) or any other configuration, such as linear. In another aspect of the invention there is provided a multi-station discrete-media printing system that includes one or more digital printing subsystems as disclosed herein.

The digital printing subsystem includes one or more printheads assemblies, each including one or more printheads, and generally also means for causing the printheads to scan a given area of a stationary object on an underlying tablet resting within the station, the printheads being driven by signals continuously derived from a digital data source so as to imprint a corresponding image, or pattern, onto the object, The printheads may be of various types, i.e. based on any of a number of suitable technologies known in the art, such as, but not limited to, any of the so-called ink-jet technologies, valve-jet, air-brush, laser printing and electrostatic printing. Each printhead may have one or more printing elements, each element imprinting one image pixel at a time; in the case if ink-jet technology, each element includes one so-called nozzle. In a multi-element printhead the elements may be arranged in a linear array or in a two-dimensional array.

In terms of said scanning means, there are possibly three basic mechanical configurations for the digital printing subsystem, namely (a) stationary, (b) single axis motion and (c) dual axes motion. Configuration (a) requires that the sum total of elements in all the printheads equals the maximum possible number of pixels in an image; the printheads are arranged, and the elements within each printhead are configured, so that the resultant pixels are evenly distributed over the entire imprinted image area. Configuration (b) requires that the printheads be arranged, and the elements within each printhead be configured, so that the totality of elements in all the printheads span one dimension of the maximal image area and that the resultant pixels are evenly distributed over that dimension; provision is made for the assembly of thus arranged printheads to move along an axis orthogonal to said dimension. In configuration (c) provision is made for a printhead, or an assembly of printheads, to move along two orthogonal axes so as imprint the entire image area; the imprinting of each pixel is timed so as to achieve even distribution of all resultant pixels.

Multi-color image printing, whether with spot colors or process colors, is generally achieved by using different printheads—with corresponding colored inks—within any one printing subsystem or configuring the printing system with a plurality of digital printing stations—each printing with a differently-colored ink. Digitally imprinting with various substances other than black or colored inks, such as plastisols, paints or coatings (i.e. creating a digitally defined pattern of sprayed painted or coated areas), for example, is another possibility within the scope of the present invention. A plurality of different such substances may be used for printing within a single system; this can be effected by corresponding printheads—possibly of different technologies (such as mentioned above), which are disposed in a single subsystem (i.e. within a single station) or in a plurality of subsystems (within corresponding stations).

For any system with a given configuration of processing capabilities in the various stations (including digitally printing with various substances—possibly by means of printheads of various technologies) the invention also contemplates allowing various batches of objects to be processed by mutually different combinations of stations or in mutually different sequences. Varying the combination is achieved through selective activation of the various processes, while varying the sequence is achieved by adding also the possibility of multiple passes of each object through the system and/or the possibility of reversing the travel of objects through the system.

More specifically there is disclosed a digital printing subsystem, to be disposed at a station of a multi-station discrete media printing system and to cooperate with the system, for imprinting any objects caused by the system to rest at the station, the subsystem comprising at least one printhead that is operative to print an image or a pattern on each of the objects according to digital data supplied to the subsystem. The system may be of the carousel type, the linear type, the oval type, or any other type and the objects may be garments or of any other type of object.

According to features of preferred embodiments of the invention, operation of the digital printing subsystem is synchronized with operation of the system or of any of its other stations, preferably by means of a sensor, for sensing any of the objects or any carrier thereof.

According to other features of preferred embodiments of the invention, the subsystem further comprises at least one printheads assembly, each including at least one of the printheads and movable along at least one axis. Preferably the printheads assemblies are movable along two axes and preferably the subsystem further comprises one or more mutually parallel fixed rails and at least one cross-rail, which is essentially normal to the fixed rails and slidably attached thereto; any of the printheads assemblies are slidably attached to a corresponding one of the cross rails. In some configurations there are two or more printheads assemblies slidably attached to any of the cross rails and in some configurations the subsystem comprises at least two of the cross rails. In some configurations the printheads assemblies are movable along three axes.

According to further features of the invention, the printheads may be of any type, selectable at least from among ink-jet, airbrush, impulse and valve, and operative to print with any of a variety of materials, including opaque material. In some configurations there are at least two printheads, which utilize mutually different printing technologies and/or print with different materials.

According to still further features of the invention, the supplied digital data may change during printing and the subsystem is operative to accordingly imprint any of the objects differently from any other objects, possibly—to imprint any consecutive objects differently.

In another aspect of the invention there is provided a multi-station discrete-media printing system, operative to intermittently move objects between successive stations thereof, the system comprising at least one digital printing station for imprinting objects, while they rest thereat, according to digital data supplied thereto. The system may be of the carousel type, the linear type, the oval type, or any other type and the objects may be garments or of any other type of object. Each of the digital printing stations preferably includes a digital printing subsystem as disclosed hereabove.

In some configurations the printing system comprises two or more digital printing stations, wherein any two of the stations are for imprinting the objects with mutually different substances. In preferred embodiments of these configurations at least two of the digital printing stations include, each, a digital printing subsystem, any two of the subsystems utilizing mutually different printing technologies and/or being operative to print with mutually different substances.

According to other features of the invention, the system is operative to imprint objects in a selectable sequence of stations and to move objects between stations in both directions.

In yet another aspect of the invention there is provided a multi-station discrete media printing system, operative to intermittently move objects between stations thereof in both directions. According to features of the invention, the system is further operative to move any object through all the stations more than once and to cause any of the objects to be processed in selectable stations at a selectable sequence.

LIST OF DRAWINGS

DETAILED DESCRIPTION

The invention will now be described, by way of example, in terms of preferred embodiments of several configurations, with reference to the drawings.

Figure 1:
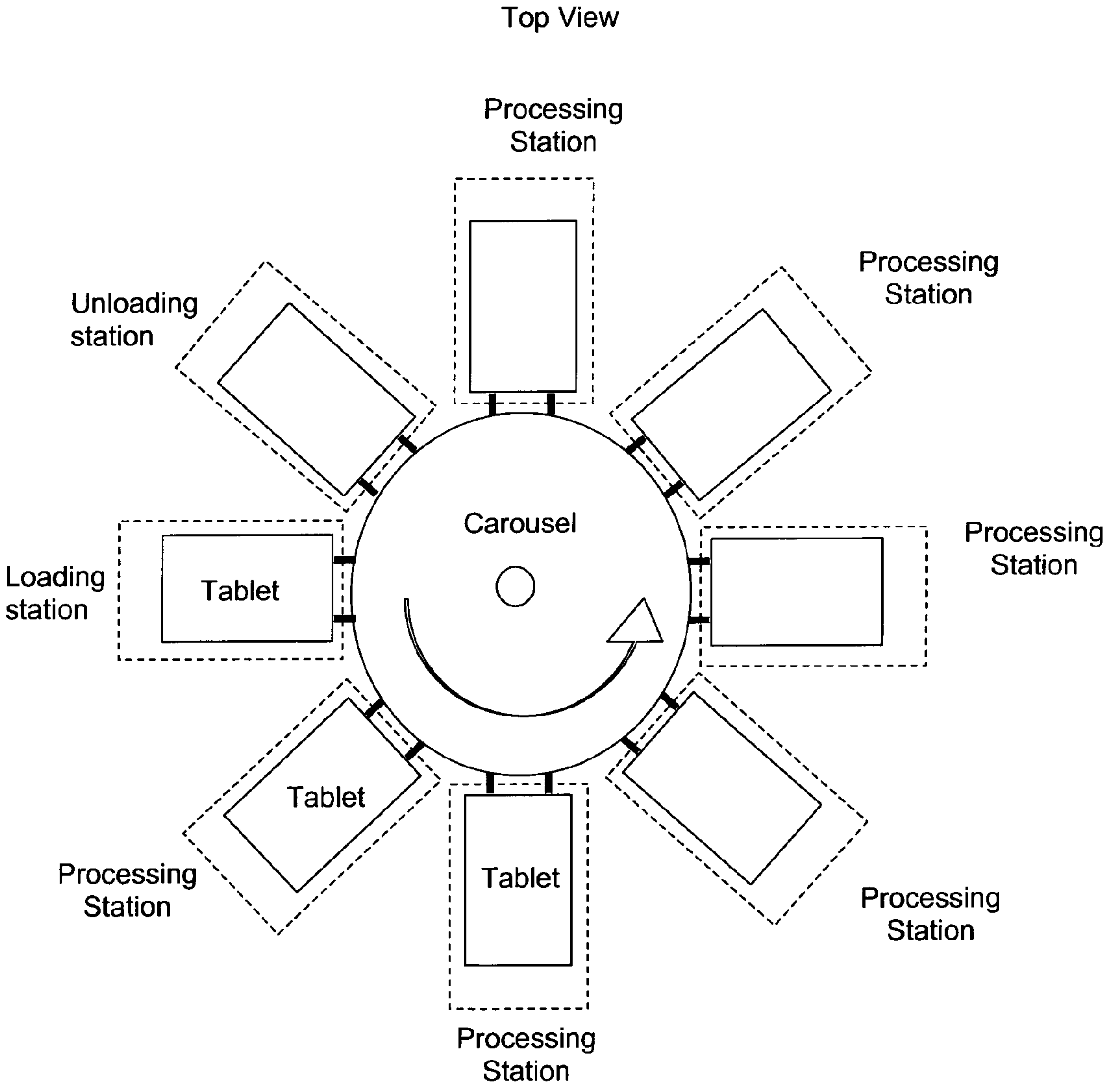
Figure 1 PRIOR ART
FIG. 1 is a schematic drawing of a rotary multi-station printing system of prior art.
Figure 2A:
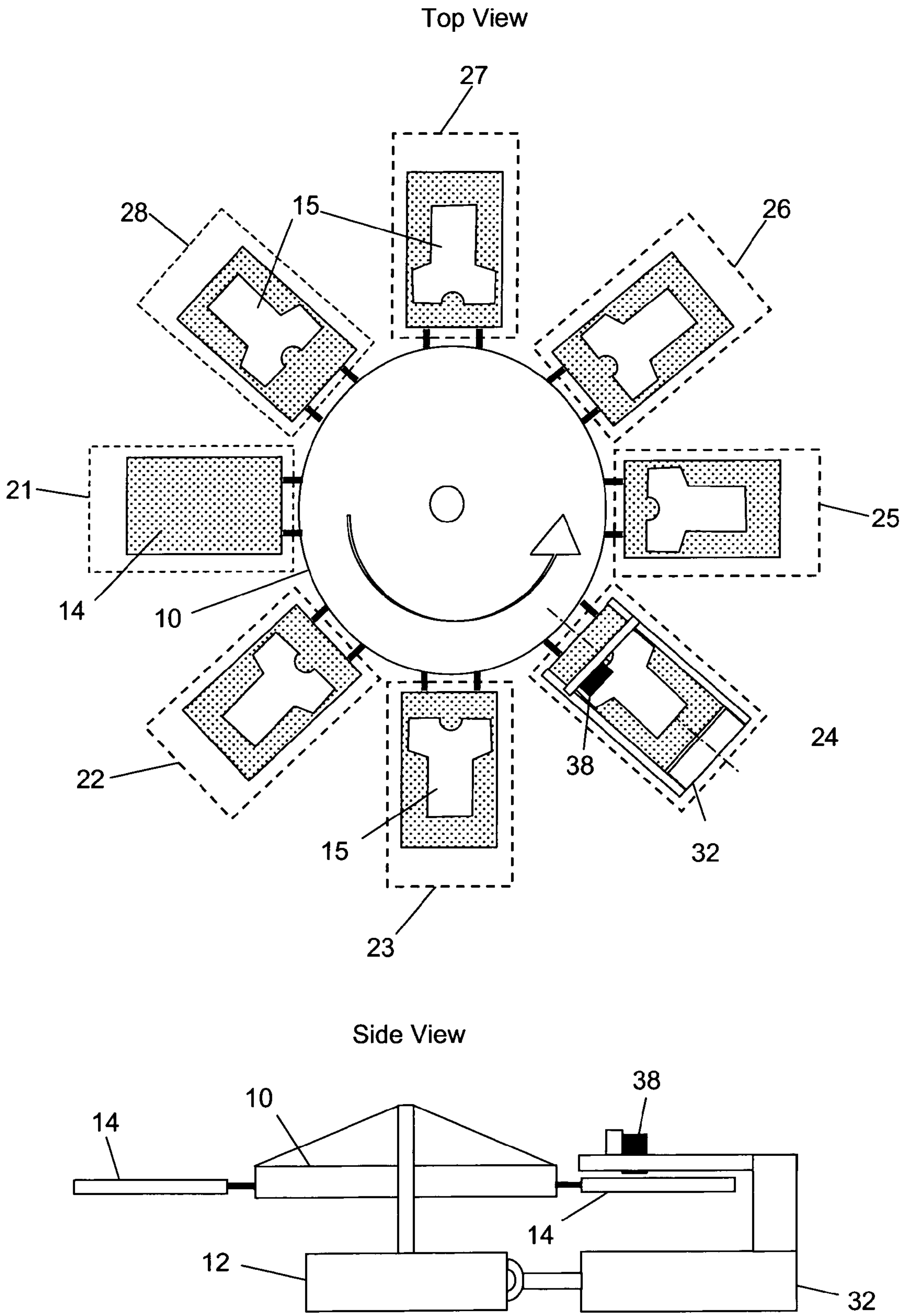
FIG. 2A is a schematic drawing of top- and side views of a rotary multi-station printing system incorporating a digital printing subsystem according to the present invention.

FIG. 2A shows schematically, in top- and side views, an exemplary rotary type of a multi-station printing system, also known as carousel, that includes a digital printing station according to the present invention. It comprises a rotary assembly and a plurality of variously equipped stations (represented in the drawing by dashed rectangles), arranged regularly along a circle concentric with the rotary assembly; in the present example there are eight stations 21-28, but any other number is also possible.

The rotary assembly, which is supported by a base 12 and driven by a rotating mechanism (not shown), includes a hub 10 and a plurality of tablets 14 that are rigidly attached to, and protrude radially from, the hub, arranged regularly around it. The number of tablets is generally equal to the number of stations, which in the present example is eight. Each tablet 14 is capable of holding an object placed thereon, e.g. a garment 15, while the assembly rotates. The rotating mechanism is operative to intermittently rotate the hub 10 so that the tablets 14 attached thereto move from one station to a circularly adjacent station and then rest there for a given period of time. Rotation of the rotary assembly is controlled by a System Controller (not shown). A “Begin” signal is generally issued by the System Controller whenever a new rest position has been reached, the signal being available to the stations to indicate when processing operations may commence therein. The equipment at each station is generally operative to issue a “End” signal whenever its processing operation has completed; the System Controller monitors all active stations and when it has received a “End” signal from all of them it causes the rotating mechanism to rotate the hub and the tablets to the next station. In an alternative configuration no signals need to be exchanged between the System Controller and the equipment at any station; instead, the presence of a tablet in a rest position at the station is sensed (as described below), to begin operation, and the operation is completed within an allotted time before subsequent rotary motion of the system. It is noted that a tablet, as in this exemplary system, is a particular form of an object carrier, generally used in multi-station printing systems to hold and transport objects being printed; the terms “tablet” and “carrier” will be used in the sequel interchangeably.

The stations are reference-numbered in FIG. 2A sequentially by 21 to 28. The logically first station, 21, is generally a loading station, in which an object to be printed is placed onto the tablet resting there; similarly the logically last station 28 is generally an unloading station, in which an object that has been processed and printed is removed from the tablet. Each of the other stations may include a particular processing subsystem that operates on the object then resting there. In the example of FIG. 2 station 22 serves to selectively apply opaque (e.g. white) background paint, station 23 serves to dry the paint, station 24 serves to digitally print on the object (as will be explained below), station 25 similarly serves to digitally print on the object station with a different-color ink, station 26 serves to dry the print inks, and station 27 serves to print the object by a conventional screen-printing process. It is noted that the process of selective painting at station 22 may be done by conventional means, such as airbrushing or screen-printing, or may also be done by means of a digital printer per the present invention, Loading, as intended for station 21 in the system of FIG. 2A, may be done manually or by means of any suitable loading mechanism, as known in the art; it may, alternatively, be done off-line, by mounting the objects on detachable palettes, which are subsequently attached to the tablets (or in their place) at the loading station. Corresponding possibilities exist for the unloading process. It is also possible that a single station serve for both loading and unloading. Except for the digital printing equipment and process, to be described below, all processes are known in the art and are utilized in current multi-station printing systems. It is noted that processes enumerated hereabove may generally be done at other sequences and therefore at different ones of the stations; moreover any of the processes may be replaced by others, not mentioned here. Any particular printing system may be designed to have various types of processing equipment installed at any station, so as to suit various objects or printing jobs. Any such system is within the scope of the present invention as long as it includes the possibility of installing, at least at one station, digital printing equipment; such equipment is generally characterized as capable of printing an image on a stationary object under control of a signal generated afresh for each impression from digitally stored image data.

Figure 2B:
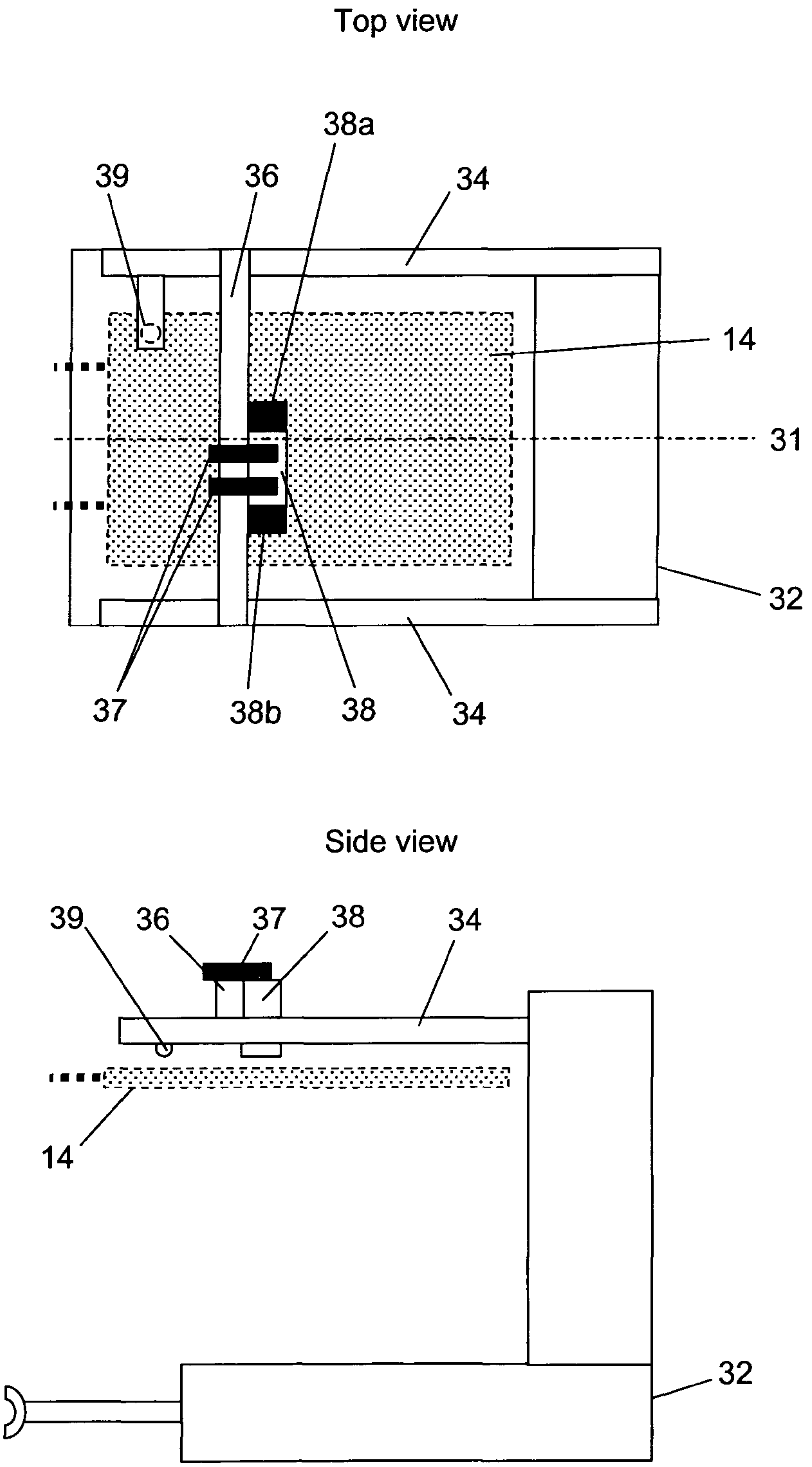
FIG. 2B is a schematic drawing of top- and side views of a digital printing subsystem in the system of FIG. 2A.
Figure 2C:
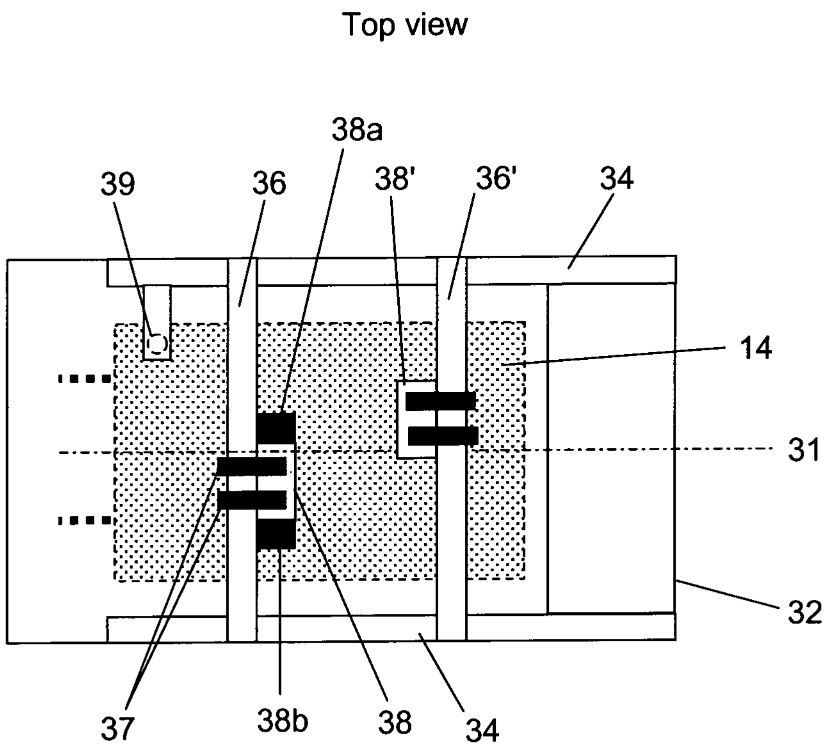
FIG. 2C is a schematic drawing of top- and side views of another configuration of the digital printing subsystem of FIG. 2B, featuring two cross-rails.
Figure 2C:
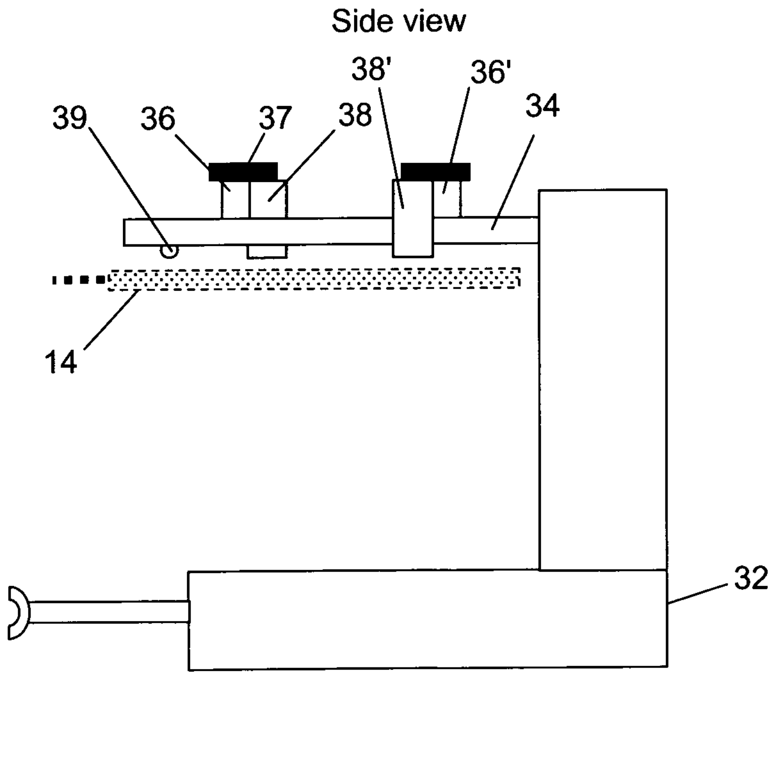
Figure 2D:
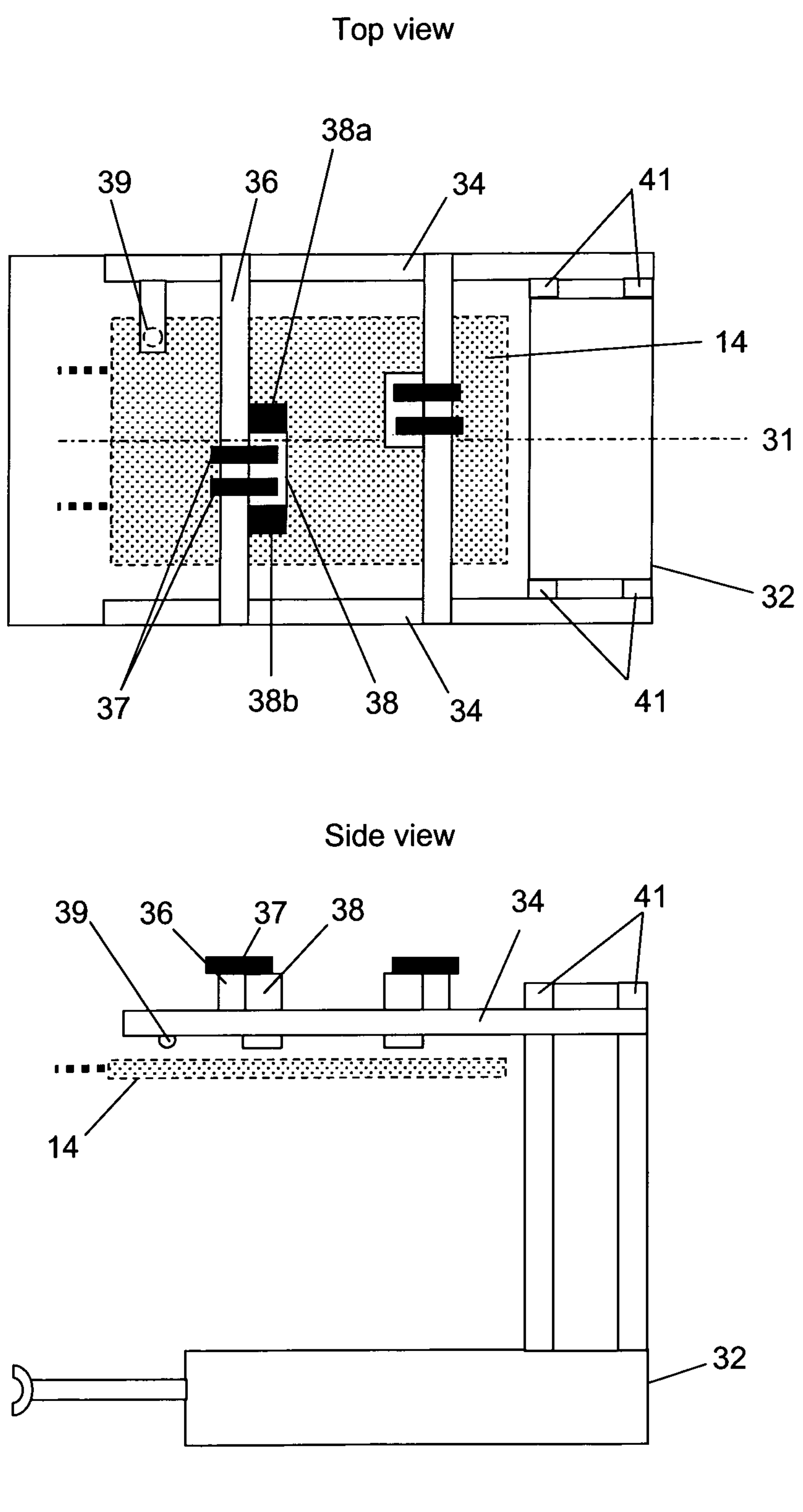
FIG. 2D is a schematic drawing of top- and side views of yet another configuration of the digital printing subsystem of FIG. 2B, featuring travel of printheads along a vertical axis.

FIG. 2B is an enlarged view of station 24, showing schematically a preferred embodiment of a digital printing subsystem (DPS) 30 according to a first configuration of the invention; it is shown as top view in the upper drawing and as side view on the right hand part of the lower drawing. Digital printing subsystem 30 basically comprises a base 32, a pair of length rails 34 which are fixedly attached thereto, a cross rail 36 which is slidably attached to both length rails 34 and a printheads assembly 38 which is slidably attached to cross rail 36, for example—by means of sliding brackets 37. As seen in FIG. 2A, base 32 of the DPS is fixedly attached to base 12 of the printing system; the attachment may be permanent, e.g. by means of bolts, or temporary, e.g. through some attaching- and detaching mechanism 33, as is generally known in the art. The latter arrangement serves for the possibility of selectively placing at the station a DPS or any other processing equipment, so as to adapt the system to various object processing jobs. For convenient transportation of the DPS to- or from a station it may be equipped with engageable wheels. Alternatively to mechanical attachment, the DPS may be fixed to the floor after accurately positioning it in relation to the system and the station (as specified below) by means of a suitable jig.

Length rails 34 are essentially parallel to a length axis 31 of the subsystem, which will also be referred to as the Y-axis, and cross rail 36 is essentially perpendicular thereto—parallel to what will be referred to as the X-axis. Printheads assembly 38 can travel along cross-rail 36 (i.e. along the X-axis), in the directions indicated by arrows 37, by a suitable transport mechanism (not shown) and driven by an electric motor (not shown) as is known in the art. Cross-rail 36 can travel along length rails 34 (i.e. along the Y-axis), in the directions indicated by arrows 35, by means of similar transport mechanism and motor (not shown). The entire subsystem is fixedly attached to the base of the printing system, or to the floor, and horizontally so positioned that its length axis 31 is essentially aligned with a radius of the carousel’s hub 10 and with the radial axis of symmetry of any tablet 14 when resting at the station. In the case that a plurality of stations are equipped with corresponding DPSs, the various DPSs must be mutually positioned with high accuracy so that the corresponding printed images (e.g. color components) align. This may be achieved by means of appropriate position- and angle adjustment mechanisms (not shown) at the rails, as is known in the art and/or by means of appropriate delays in the signals to the printheads; in any case, the position adjustment operation is preferably done with the aid of printed test marks. Vertically DPS 30 is positioned so that the bottom of printheads assembly 38 is at a given distance above a resting tablet 14; preferably this distance is adjustable so as to adapt to various print technologies or to objects of various thicknesses.

Printheads assembly 38 includes one or more printheads, each having one or more elements, an element being defined by its marking one image pixel at a time. Preferably the printheads are based on an ink-jet technology; several such technologies are well known in the art and such printheads are commercially available, such as from Spectra division of Dimatix (New Hampshire USA), Ricoh Printing Systems America (California), XAAR (Cambridge, UK) and others. In the case of ink-jet the elements are formed as nozzles or orifices through which ink drops are ejected. When a printheads assembly includes a plurality of printheads, they are mutually positioned so that their elements are mutually aligned, the alignment being such that resultant image pixels are regularly spaced. Printheads may also be based on other digitally-driven technologies, such as electrically actuated air-brush, valve-jet, laser exposing of a pre-coated material, electrostatic charging of a pre-coated material, thermal imaging (e.g. heat transfer) or any other ones known in the art.

In certain configurations of the DPS, according to the present invention, it is possible to incorporate in one DPS two or more printheads that are of different technologies—generally in order to print with various materials. For example, air brush printheads (such as those available from Printos UK, a business unit of Videojet Technologies, USA) can be employed, to print high viscosity materials, in combination with three or four piezoelectric inkjet printheads, printing process colors, within the same DPS. In one configuration, the printheads assembly includes two or more subassemblies, such as subassemblies 38*a* and 38*b* in FIG. 2B, each including printheads of a particular technology, which may be different from that of the other subassemblies. The various printheads can print either simultaneously, in a single scan of the object by the printheads assembly, or sequentially, in corresponding scan sequences. In other configurations (discussed below), printheads of different technologies are in corresponding separate printheads assemblies, possibly each movable independently. Alternatively or additionally, multiple digital printing technologies may also be divided among corresponding dedicated stations, e.g. stations 24 and 26 in FIG. 2A.

Figure 4:
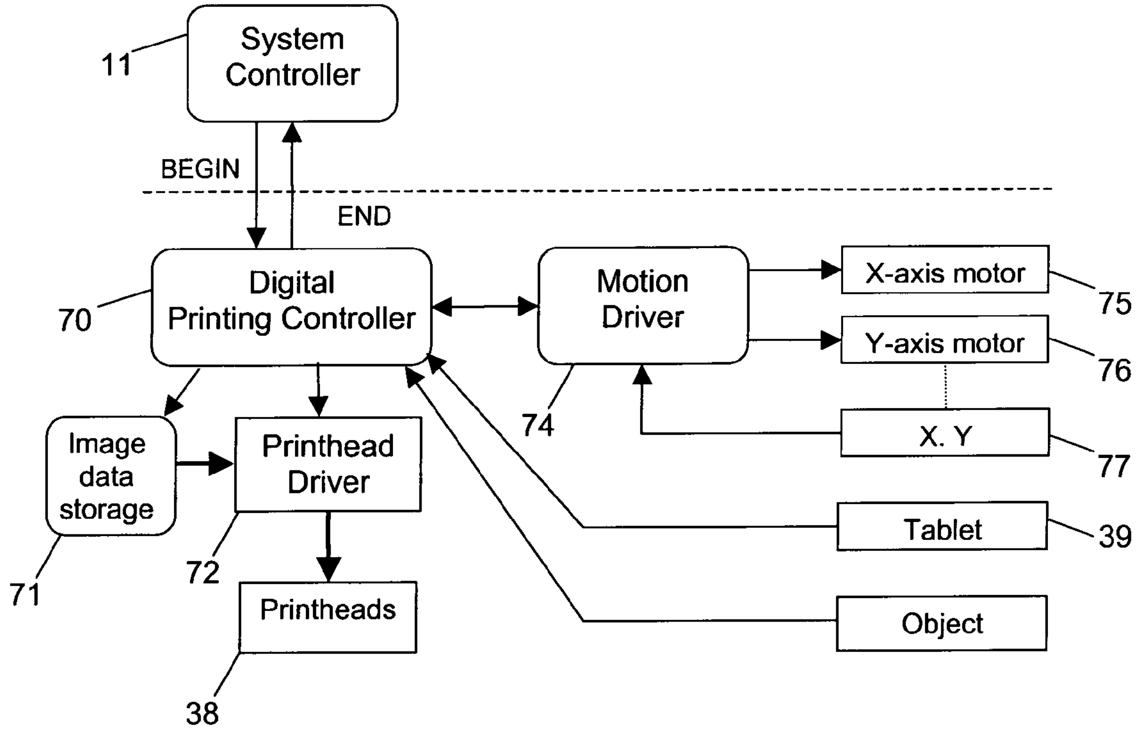
FIG. 4 is a block diagram of control functions and data flow in the digital printing subsystem of FIGS. 2B-2D.

Referring now to FIG. 4, which is a schematic block diagram of relevant electronic functions and connections in the digital printing subsystem, it is seen that all the printheads in printheads assembly 38 are electrically connected to a Printheads Driver 72, which is operative to receives image data from digital storage 71 and to translate them into appropriate printhead drive signals in a sequence and timing commensurate with the scanning by the printheads of corresponding intended image portions on the object (as will be further explained below). In the digital storage 71 is stored a digital representation of the entire image to be printed on an object. Optionally, the stored image data are modifiable between successive printing operations (e.g. while the tablets move between adjacent stations), thus enabling customization of images on the objects.

Also shown in FIG. 4 is a Motion Driver 74, which is operative to issue appropriate signals to X-axis motor 75 and Y-axis motor 76 (both not shown in FIG. 2B), to move the printheads assembly 38 along rails 36 and 37 (FIG. 2B) respectively. The position of the printheads assembly along each axis is preferably sensed by Encoders 77; the latter issue corresponding position signals, which are fed back to Motion Driver 74 for appropriate control of the signals to the motors. The signals from Encoders 77 may also be applied to Printheads Driver 72 for synchronizing the printing operation with the current positions of the printheads. Control of the operation of the DPS is provided by Digital Printing Controller 70, which communicates with Printhead Driver 72 and with Motion Driver 74, as well as with Image Data Storage 71. In one configuration of the DPS, Digital Printing Controller 70 also communicates with the System Controller 11 for mutual coordination of operation, Optionally, or alternatively (in a second configuration), a Tablet Sensor 39 (shown also in FIG. 2B) is operative to sense the presence of a tablet in the station and to notify Digital Printing Controller 70 accordingly. Also optionally, an Object Sensor (not shown) is operative to sense the presence of an object (or a given mark thereon) on the tablet for the purpose of either more closely positioning the printed image with respect to the object (in case the object's position on the table is variable) or suspending printing operation if an object is missing.

Operation of the DPS will now be explained with reference to FIGS. 2B and 4. Cross-rail 36 and, relative thereto, printheads assembly 38 are first positioned at respective parking locations. When Digital Printing Controller 70 receives a "Begin" signal from System Controller 11 (or, in an alternative configuration, from Tablet Sensor 39 when it senses the presence of a new tablet in the resting position), it issues signals to (a) Motion Driver 74 for it to begin the image-area scanning motion of the printheads assembly, (b) the Image Data Storage module 71, for it to begin sending image data to Printheads Driver 72, and (c) the Printheads Driver, for it to begin printing. Digital Printing Controller 70 may optionally refrain from issuing said signals if and when a signal from Tablet Sensor 39 indicates that no tablet is present or that a tablet is mis-positioned; it may also optionally refrain from issuing said signals if and when a signal from an object sensor indicates that no object is present on the tablet or that the object is misplaced. Thereafter Digital Printing Controller 70 keeps track of the operation of the three aforementioned modules; when the entire image area has been scanned by the printheads assembly or when all image data has been transmitted from storage to the printheads, Controller 70 sends a "End" signal to System Controller 11, thereby indicating to it that the tablet, with the object attached thereto, may move on to the next station. In an alternative configuration, the entire system operation may be synchronous, that is—the tablets move from station to station at regular tire intervals; there is then no need for an End signal and the entire printing operation of an object must be accomplished within the given time interval.

During printing operation (e.g. between the "Begin" and "end" signals), Motion Driver 74 issues signals to X-axis motor 75, which drives printheads assembly 38 along cross-rail 36, and to Y-axis motor 76, which drives cross-rail 36 along length rails 34. The motion along each rail is preferably sensed by a respective position encoder 77, which accurately senses the position of the printheads assembly and feeds corresponding signals back to Motion Driver 74; these signals are applied therein to modify the respective signals to the motors so as to control the motion of the printheads assembly along each axis. It will be appreciated that other means of controlling the motion of the printheads assembly are known in the art, such as rate feedback or the use of stepping motors, all coming within the scope of the invention. Preferably, motion along the X-axis (i.e. the cross-rail) is relatively fast and repetitive. Motion (of the cross-rail and the printheads assembly riding thereon) along the Y-axis (i.e. the length rail) during printing is in a single pass along the length rail, followed by a non-printing return to the starting, or parking, position; it may be in either of two modes—(i) intermittent or (ii) continuous. In the intermittent mode cross-rail 36 is stationary during the motion of printheads assembly 38 and moves a certain distance preferably during direction changeover of the printheads assembly. In the continuous mode, cross-rail 36 moves at an essentially constant rate, such that during its entire travel over the length of the image area, the printheads assembly completes a given number of sweeps across the image area. In the intermittent mode, printing occurs preferably during motion of the printheads assembly in each direction along the cross-rail; in the continuous mode printing occurs preferably during motion of the printheads assembly in a forward direction and is suspended during reverse motion.

Also during printing operation, Printheads Driver 72 sends printing signals to the various printheads in printheads assembly 38, according to the data received from Image Storage 71 and in synchronism with the printheads assembly's current position. The latter synchronism is preferably achieved by means of signals flowing from Encoders 77 to the Printheads Driver. Characteristically for digital printing systems, the data stored in Inage Storage 71, or the data sent from there to Printheads Driver 72, may change during the printing process—usually between the imprinting of consecutive objects (i.e. objects resting consecutively in the digital printing station, e.g. objects on adjacent tablets). In such a case, the resultant images printed on the consecutive objects would generally be different. Such a change may occur between batches of objects or even between individual objects; the latter case is sometimes referred to as individualized or customized printing.

In order to print color images, printheads assembly 38 may include printheads that print with diversely colored inks; the inks may be of any color (so-called spot colors) or, for continuous-tone color images, the ink colors are preferably the four so-called process colors (cyan, magenta, yellow and black), but may also include additional colors. Alternatively there may be a corresponding number of digital printing stations in the system, with a DPS in each, each station printing in a different color. Another possible alternative is a plurality of stations, each with a DPS whose printheads assembly includes a plurality of printheads printing in different colors. The inks (or dyes, as they are known in textile printing) may be of any type used in the art, including, for example, water- or solvent based inks, powders or hot-melt; the latter type may require the inclusion of devices for heating and temperature control. A digital printing subsystem, as disclosed herein, may also serve to image-wise apply a wide variety of substances other than ink; these include, for example, opaque background paint (as in station 22 of the system of FIG. 2A), a metallic layer (such as lurex), protective (transparent) coating, dyed coating, plastisols (to effect a glossy or raised layer), pre- or post-printing treatment (e.g. for textiles) or any other substance. In such cases, printheads assembly 38 includes one or more printheads of suitable printing technology.

A plurality of different such substances may be used for printing within a single system; this can be effected by corresponding printheads—possibly of different technologies (such as mentioned above), which are disposed in a single DPS (i.e. within a single station) or in a plurality of DPSs (within corresponding stations). As in the case of process-color inks, the various substances, when imprinted, may cooperate to form particular image areas. On certain textiles, for example, certain inks or dye materials require a pre-print treatment, and a post-print treatment, all cooperating in forming a stable color imprint. As another example, a cationic or anionic coating, followed by electrostatic printing, in turn followed by application of toner, all cooperate in forming an imprinted image. It is noted that in both examples, the application of the first and third substances is advantageously confined to the desired image areas; though the substances are generally quite transparent, their application to the entire surface of the object would be noticeable or would interfere with processes in other image areas.

It will be appreciated that the structure of the digital printing subsystem 30, and particularly of the mechanism for transporting the printheads assembly over the image area in a two-dimensional raster fashion, may be different from that described hereabove and shown in FIGS. 2A and 2B. For example, there may be a single length rail (rather than a pair of rails), or there may be a pair of cross-rails (rather than a single one) or the rail (or rails) attached to the base may be a cross rail while a length rail is slidably attached thereto. All such and other variations of the mechanism are within the scope of the present invention.

A preferred embodiment of an alternative configuration (not shown) of the digital printing subsystem according to the present invention is similar to that of FIGS. 2 A and 2B except that printheads assembly 38 is constructed so that the entirety of elements (whether in a single printhead or a plurality of printheads) can mark simultaneously across the entire image width. In this case printheads assembly 38 is fixedly attached to cross rail 36 and with it is transported along the length axis only, thereby scanning and thus imprinting the entire image area. This configuration is suitable for relatively fast printing operations or where the image resolution need not be high (though the resolution may be improved by repeated imprinting, with the printhead displaced a minute distance in the X and/or Y direction).

A preferred embodiment of another alternative configuration (not shown) of the digital printing subsystem according to the present invention is, again, similar to that of FIGS. 2A and 2B except that printheads assembly 38 is constructed so that the entirety of elements (whether in a single printhead or a plurality of printheads) can mark simultaneously over the entire image area. In this case no rails are required and the printheads assembly does not move at all; all pixels of the image are imprinted simultaneously. This configuration is suitable for very fast printing operations or where the image resolution may be low—for example, in applying background paint.

Further configurations of a digital printing subsystem according to the present invention feature a plurality of printheads assemblies within a single DPS. As discussed above, these may, for example, serve to print with differently colored inks or with different substances (as discussed above with respect to multiple DPSs or stations). In the latter case, the underlying printing technology may generally differ among the printheads assemblies in the DPS. In one such configuration (not shown), a plurality of printheads are slidably attached to a single, common, cross-rail. In another configuration, depicted schematically in FIG. 2C for the case of two printheads assemblies, each printheads assembly is slidably attached to a corresponding cross-rail, the cross-rails being slidably attached to a common pair of length rails. The cross-rails are generally capable of moving independently along the length rails, under control of suitably modified Digital Printing Controller 70 and Motion Driver 74 (FIG. 4), Clearly, when the scan motion of the various printheads assemblies are independently controllable, the time relation between their printing action may be set to any value—from simultaneity to strict sequentiality.

Further configurations of the digital printing subsystem have the capability of moving the (one or more) printheads assemblies also along a Z-axis, normal to the tablet (i.e. usually vertical). Such capability may have any of several purposes: (1) clearing passage for any objects on a table while it is moving; (2) adapting to the vertical position of the printable surface of various objects or of various printable surfaces in any one object; (3) to print on a curved surface; (4) to adapt to height variations among the various tablets. For purpose 2, there may optionally be an object surface height sensor, utilizing any means known in the art; this may possibly be identical to the aforementioned object sensor. For purpose 4, there may optionally be a tablet height sensor, again utilizing any means known in the art; this may possibly be identical to the aforementioned tablet sensor 39 (FIG. 2B).

Motion along the Z-axis may be variously effected. For example, in one configuration, depicted schematically in FIG. 2D, there are several (in this example—four) vertical rails 41 fixedly attached to base 32. Length rails 34 are slidably attached to vertical rails 41, so that the entire scanning mechanism is movable vertically. It is noted that in the example of FIG. 2D, there are two cross-rails (as in FIG. 2C); clearly, there may be also any other number of cross-rails, including one (as in FIG. 2B). In another exemplary configuration (not shown), any cross-rail is slidably attached to a pair of vertical rails, which, in turn, are slidably attached to length rails 34. In yet another exemplary configuration (not shown), any printheads assembly is slidably attached to a vertical rail, which, in turn, is slidably attached to the corresponding cross-rail. Clearly, for any such configuration there must be a suitable Z-axis motor and the Digital Printing Controller 70 and Motion Driver 74 of FIG. 4 must be modified accordingly. It would be appreciated that also other means and mechanisms for moving the printheads assemblies along the three axes are possible, all coming within the scope of the present invention.

Figure 3A:
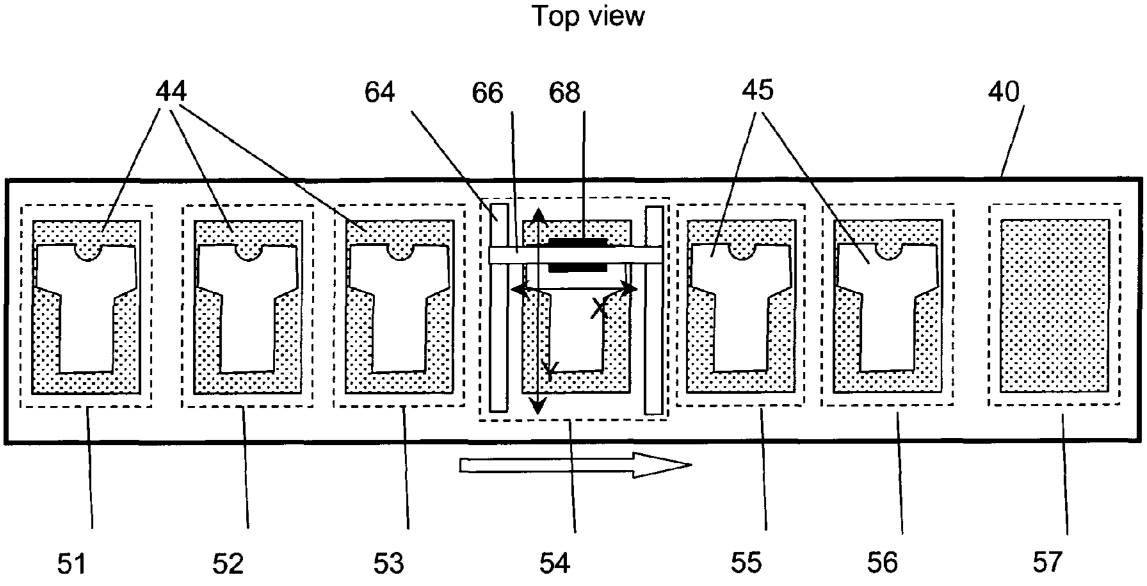
FIG. 3A is a schematic drawing of top view of a linear multi-station printing system incorporating a digital printing subsystem according to the present invention.

Returning now to the entire system, FIG. 3A depicts schematically a top view of an exemplary linear type of a multi-station printing system that incorporates a preferred embodiment of a digital printing subsystem according to the present invention. There is shown an endless belt, or conveyer, 40 that is movable in an upper plane in the direction of the arrow (from left to right) and returns in a lower plane (hidden from view). To belt 40 are attached, or attachable, at regular intervals, palettes 44, on which objects to be printed may be placed. It is noted that also other means of carrying and transporting the palettes are possible, such as chained platform segments, for example. Also shown schematically (as dashed rectangles) are processing stations at the same regular intervals. In the example of FIG. 3A there are seven stations, reference numbered 51 to 57, which are equipped to apply processes similar to those of corresponding stations in the system of FIG. 2; naturally, the first station, 51, is a loading station and the last station, 57, is an unloading station. Belt 40 is driven by a transport mechanism (not shown) so as to intermittently move each palette 44 from one station to the next station and to rest there while being processed. Control of belt motion and its synchronization with the processing operations is similar to those described above with respect to the rotary system. It is noted that a palette is another particular form of an object carrier, in its meaning in the present disclosure.

Digital printing station 54 in FIG. 3 includes a digital printing subsystem similar to that in station 24 of the system of FIG. 2. Here the cross rail 56 is oriented in the direction of belt motion, while length rails 54 are oriented orthogonally thereto; obviously also the reverse situation, as well as other mechanical configurations, are possible, as discussed hereabove. Operation of the digital printing subsystem, including motion of printheads assembly 68, is similar to that of FIG. 2. The two alternative configurations of printheads assembly and image scanning mechanism, discussed above, are possible within the linear system as well.

Figure 3B:
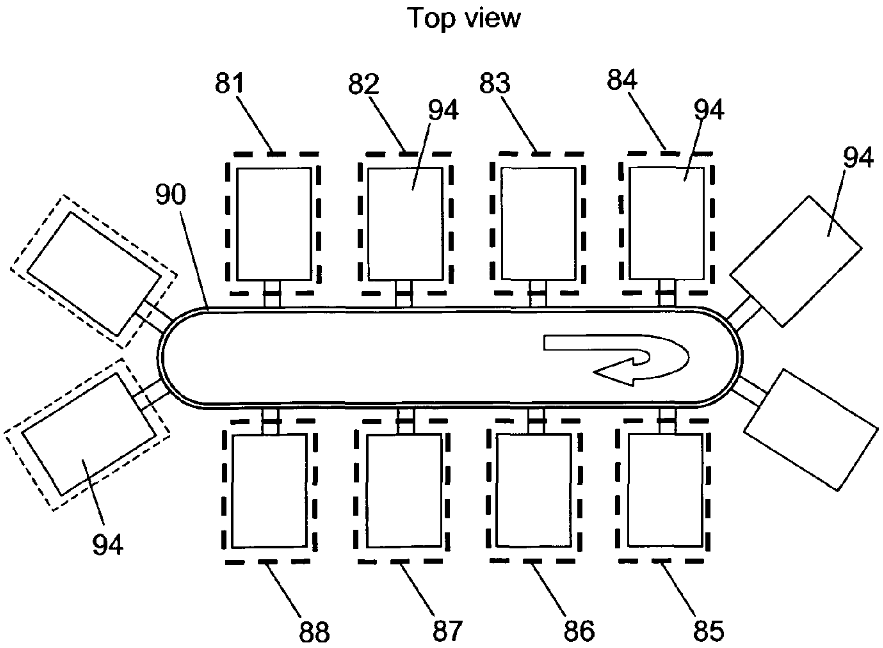
FIG. 3B is a schematic drawing of top view of an oval multi-station printing system incorporating a digital printing subsystem according to the present invention.

FIG. 3B depicts schematically a top view of another exemplary type of a multi-station printing system that incorporates a preferred embodiment of a digital printing subsystem according to the present invention; it will be referred to as an oval system. It has an endless conveyor, in a planar oval configuration, 90, to which are attached tablets 74. As the conveyor moves intermittently (by means of a drive mechanism, not shown), the tablets move between processing stations 81-88, which are arranged along the two linear sections of the oval (though some of them may generally also lie at the round sections). Any of these stations may be equipped with digital printing subsystems as described hereabove, as well as with conventional printing- or other processing equipment; two of these (or additional ones, not marked) may serve for loading and unloading, Operation of the oval system is similar to that of the systems of FIGS. 2A and 3A and should be readily understood by those versed in the art.

For any system with a given configuration of processing capabilities in the various stations (including digitally printing with various substances—possibly by means of printheads of various technologies) the invention also contemplates allowing various batches of objects to be processed in mutually different combinations of stations or in mutually different sequences. Supposing, for example, that a particular system is configured so that four consecutive processes A-D) (in the order of normal tablet motion) are, respectively—(A) apply white paint, (B) print in color, (C) print with lurex and (D) apply protective coating (where each process is effected in a corresponding station, possibly followed by a drying station, if required). Then, for example, one particular batch may undergo processing in the sequence A, B, D, while another batch may be processed in the sequence A, B, A, C and yet another batch may be processed in the sequence C, D, A, B. Varying the combination is achieved through selective activation of the various processes, while varying the sequence is achieved by adding the possibility of multiple passes of each object through the system and/or the possibility of reversing the travel of objects through the system. The latter possibility is enabled by a capability of the system to move the tablets (e.g. rotate the carousel), with the objects thereon, in both directions, which is an optional feature of the present invention. In the examples above, the first sequence, ABD, would be achieved by simply not activating station C; the second sequence, ABAC, would be achieved by running each object through the system twice (two rotations of the carousel between loading and unloading), activating only stations A and B in the first pass and stations A and C—in the second pass; also the third sequence CDAB would be served by two passes, first activating C and D, then A and B. Depending on the number of additional stations in the system, the second and third sequences may be effected faster by providing reverse motion, rather than an additional pass. Thus for the second sequence, after processes A and B, the object would be carried back to the station of process A, then on to that of process C. Similarly for the third sequence, after processes C and D the object would be carried back to the station of process A, then on to that of process B; of course, if the system had no further stations beyond those carrying out the four processes of this example (including drying stations), then this third sequence would require less travel time when moving only forward, i.e. from D on to A. Clearly, such multi-pass or reverse operation constitutes a special mode, in which only one object, or a few, is processed at a time (since objects on the other carriers would then generally not be at the proper stations for processing them in the given sequence).

It is noted that the feature of moving objects between stations in both directions is applicable to multi-station printing systems in general, not necessarily having digital printing capabilities.

A digital printing subsystem, as disclosed herein, may be manufactured as a product by itself, to be attachable in the place of any station to any existing multi-station printing system. Alternatively it may be independently manufactured to eventually become a part of any particular multi-station printing system during assembly by its manufacturer (OEM). Still alternatively, it may be manufactured directly as part of any particular multi-station printing system. In the first case, certain flexibility must be designed into the mechanical and electrical interface; alternatively and preferably no mechanical interface is provided and the DPS is independently positioned and aligned with the system as described above; also alternatively and preferably no electrical interface is provided and operation is independently timed and possibly synchronized with the system by means of sensors, such as a tablet sensor as described above.

While the invention has been described in terms of particular embodiments and certain configurations of multi-station printing systems and of digital printing subsystems, it will be readily understood that the invention is equally applicable to other configurations and embodiments and that it is defined solely by the claims to follow.

The invention claimed is:

1. A digital printing subsystem, to be disposed at a station of a multi-station discrete media printing system and to cooperate with the system, for imprinting an object caused by the system to rest at said station, the subsystem comprising at least two printheads, each operative to print an image or a pattern on the object according to digital data supplied to the subsystem while the object continues to rest at said station; at least two of said printheads printing with mutually different materials, the differences being other than in color.

2. The subsystem of claim 1 wherein said at least two printheads utilize mutually different printing technologies.

3. The subsystem of claim 1, its operation being synchronized with operation of the system or of any of its other stations.

4. The subsystem of claim 1, further comprising at least one printheads assembly, each including at least one of said printheads and movable along at least one axis during printing.

5. The subsystem of claim 4, wherein said printheads assemblies are movable along two axes during printing.

6. The subsystem of claim 5, further comprising one or more mutually parallel fixed rails and at least one cross-rail, which is essentially normal to said fixed rails and slidably attached thereto; any of said printheads assemblies being slidably attached to a corresponding one of said cross rails.

7. The subsystem of claim 4, wherein said printheads assemblies are movable along three axes.

8. A multi-station discrete media printing system, operative to intermittently move objects between successive stations thereof, the system comprising at least two digital printing stations that each receive digital data and imprint an object according to the digital data; at least two of said stations being operative to imprint the object with mutually different materials, the differences being other than in color.

9. The system of claim 8 wherein said at least two stations include, each, a digital printing subsystem, the respective subsystems being operative to print with said mutually different materials and utilizing mutually different digital printing technologies.

10. The system of claim 9, wherein at least one of the digital printing technologies is other than inkjet technology.

11. The system of claim 8, operative to move the object between stations in both directions.

12. The system of claim 8, wherein said printing operation is synchronized with resting of the object at the respective digital printing stations.

13. The system of claim 8, wherein said supplied digital data may change during printing, the system being operative to accordingly imprint the object differently from another object.

14. The system of claim 8, operative to imprint the object in a selectable sequence of stations.

15. A multi-station discrete media printing system, operative to intermittently move objects between successive stations thereof, the system comprising at least one digital printing station for imprinting an object, while the object rests at the digital printing station, according to digital data supplied thereto; at least one of said digital printing stations including a digital printing subsystem, which includes at least two printheads that are operative to print corresponding images or patterns on the object, according to said digital data, with mutually different materials, while the object continues to rest at the digital printing station.

16. The system of claim 15 wherein said at least two printheads utilize mutually different printing technologies.

17. The system of claim 15, wherein said printing operation is synchronized with said resting of the object.

18. The system of claim 15, wherein each of said printheads is part of a printheads assembly, which is movable along at least one axis during printing.

19. The system of claim 18, wherein said printheads assembly is movable along two axes during printing.

20. The system of claim 18, wherein said printheads assembly is movable along three axes.

21. The system of claim 15, wherein said supplied digital data may change during printing, the system being operative to accordingly imprint the object differently from another object.

* * * * *